United States Patent
Marce et al.

(10) Patent No.: US 10,055,425 B2
(45) Date of Patent: Aug. 21, 2018

(54) METHOD FOR STORING CONTENT DATA OF A CONTENT RECEIVER IN A PORTABLE STORAGE DEVICE, AND ASSOCIATED CONTROL DEVICE

(71) Applicant: THOMSON LICENSING, Issy de Moulineaux (FR)

(72) Inventors: Nicolas Marce, Bruz (FR); Alain Tritschler, Rennes (FR)

(73) Assignee: THOMSON LICENSING, Issy-les-Moulineau (FR)

(*) Notice: Subject to any disclaimer, the term of this patent is extended or adjusted under 35 U.S.C. 154(b) by 605 days.

(21) Appl. No.: 14/360,927

(22) PCT Filed: Nov. 29, 2012

(86) PCT No.: PCT/EP2012/073995
§ 371 (c)(1),
(2) Date: May 27, 2014

(87) PCT Pub. No.: WO2013/079612
PCT Pub. Date: Jun. 6, 2013

(65) Prior Publication Data
US 2014/0330876 A1    Nov. 6, 2014

(30) Foreign Application Priority Data
Dec. 1, 2011  (FR) .................... 11 61055

(51) Int. Cl.
G06F 7/00   (2006.01)
G06F 17/30  (2006.01)
(Continued)

(52) U.S. Cl.
CPC ...... G06F 17/30194 (2013.01); G06F 3/0607 (2013.01); G06F 3/0643 (2013.01);
(Continued)

(58) Field of Classification Search
CPC . G06F 13/385; G06F 3/0608; F06F 17/30194
(Continued)

(56) References Cited

U.S. PATENT DOCUMENTS 6,609,187 B1 * 8/2003 Merrell ............... G06F 3/0601
                                           707/999.202
6,910,115 B2   6/2005 Weirauch
(Continued)

FOREIGN PATENT DOCUMENTS

CN      1952890     4/2007
JP     2005099968   4/2005
(Continued)

OTHER PUBLICATIONS

"Dual_Boot Windows 7 and Ubuntu in Perfect Harmony", Kevin Purdy, Nov. 12, 2009.*
(Continued)

*Primary Examiner* — Binh V Ho
(74) *Attorney, Agent, or Firm* — Brian J. Dorini, Esq.; Robert D. Shedd, Esq.

(57) ABSTRACT

A control device is designed to equip a content receiver having a first file system. This device is arranged, consecutively to a first coupling of a storage device, having a second file system incompatible with the first file system, on the content receiver, on the one hand, to instruct the content receiver to transmit to the storage device a set of control data comprising a third system of the virtual file type compatible with the first file system, so that it stores this set in at least one file of its second file system, and, on the other hand, to control the transmission of data content received by the content receiver, from the latter to the storage device, under the control of the first file system, such that the content data is stored in the storage device under the control of the third file system.

18 Claims, 1 Drawing Sheet

(51) Int. Cl.
 *G06F 13/38* (2006.01)
 *G06F 3/06* (2006.01)
 *H04L 29/08* (2006.01)
(52) U.S. Cl.
 CPC .......... *G06F 3/0661* (2013.01); *G06F 3/0673* (2013.01); *G06F 13/385* (2013.01); *G06F 17/30861* (2013.01); *H04L 67/06* (2013.01)
(58) Field of Classification Search
 USPC ........................................................ 707/827
 See application file for complete search history.

(56) References Cited

U.S. PATENT DOCUMENTS

| | | | |
|---|---|---|---|
| 7,683,942 B2 | 3/2010 | Tsujii et al. | |
| 8,634,692 B2 | 1/2014 | Ono | |
| 2003/0101173 A1* | 5/2003 | Lanzatella | G06F 3/0601 |
| 2003/0110188 A1 | 6/2003 | Howard et al. | |
| 2004/0223726 A1 | 11/2004 | Lee | |
| 2006/0288040 A1 | 12/2006 | Boerger et al. | |
| 2008/0025708 A1* | 1/2008 | Ono | G11B 27/034 386/286 |
| 2008/0098040 A1* | 4/2008 | Xie | G06F 17/30191 |
| 2008/0250164 A1 | 10/2008 | Chen et al. | |
| 2008/0301195 A1 | 12/2008 | Chu | |
| 2009/0172049 A1* | 7/2009 | Hahn | G06F 3/0608 |
| 2009/0216916 A1 | 8/2009 | Jang et al. | |
| 2009/0254966 A1* | 10/2009 | Josephs | H04N 7/17318 725/140 |
| 2009/0287752 A1 | 11/2009 | Yoshida | |
| 2009/0300020 A1 | 12/2009 | Chen et al. | |
| 2010/0070544 A1 | 3/2010 | Gopalan et al. | |
| 2010/0146534 A1* | 6/2010 | Chen | H04N 7/165 725/25 |
| 2010/0211556 A1 | 8/2010 | Ueda et al. | |
| 2010/0250892 A1* | 9/2010 | Logan | G06F 9/5077 711/173 |
| 2010/0318714 A1 | 12/2010 | Kim et al. | |
| 2011/0055288 A1* | 3/2011 | Giannini | G06F 17/30233 707/805 |

FOREIGN PATENT DOCUMENTS

| | | |
|---|---|---|
| JP | 2006146466 | 6/2006 |
| JP | 2008034954 | 2/2008 |
| JP | 2008182339 | 8/2008 |
| JP | 2010191489 | 9/2010 |
| JP | 4561872 | 10/2010 |
| JP | 04653035 | 3/2011 |
| WO | WO10030062 | 3/2010 |
| WO | WO2010147546 | 12/2010 |
| WO | WO2011003464 | 1/2011 |

OTHER PUBLICATIONS

"All hard drives look the same, so why can't Windows computers read Mac-formatted drivers?", Nov. 13, 2012.*

"Dual Boot Windows 7 and Ubuntu in Perfect Harmony", Kevin Purdy, Nov. 12, 2009.*

Anonymous, "Since 1996, MACDRIVE is the Standard for Accessing MAC Disks on Windows Computers", Mediafour, http://www.mediafour.com/software/macdrive/, 2015, pp. 1-9.

* cited by examiner

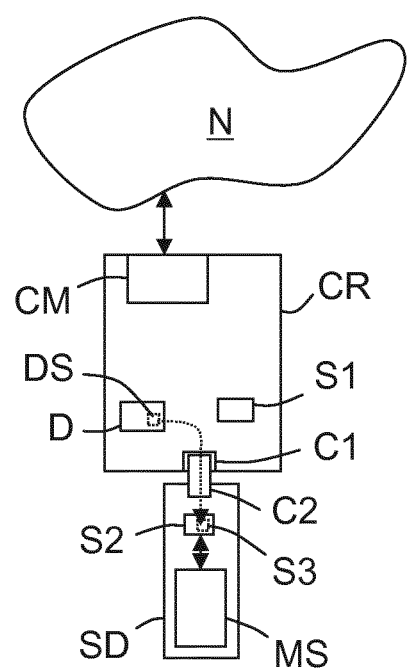

METHOD FOR STORING CONTENT DATA OF A CONTENT RECEIVER IN A PORTABLE STORAGE DEVICE, AND ASSOCIATED CONTROL DEVICE

This application claims the benefit, under 35 U.S.C. § 365 of International Application PCT/EP2012/073995, filed Nov. 29, 2012, which was published in accordance with PCT Article 21(2) on Jun. 6, 2013 in English and which claims the benefit of French patent application No. 1161055, filed Dec. 1, 2011.

FIELD OF THE INVENTION

The invention relates to content receivers and more precisely the storing of content data that such receivers receive.

It is understood by "content receiver" an item of communication equipment capable of connecting to at least one communication network in order to receive content, eventually broadcast. Consequently it might involve, for example, a type of Set-Top Box (STB), a decoder or a residential gateway.

Moreover, "content" implies a data set which defines a programme of television, video or audio (radiophonic or musical), or games or multimedia, possibly on demand, or even a computer file (or "data").

BACKGROUND OF THE INVENTION

Persons skilled in the art know that certain content receivers have a memory which allows them to store content data received from a communication network to which they are connected. This storage, like certain other features, is controlled on the content receiver by a file system, for example type FAT (File Allocation Table) or NTFS (New Technology File System).

When a content receiver holds a full memory and the user wants to store new content without erasing previously stored content, or where a content receiver does not contain a storage memory and the user wants to store a received content, this content receiver must be coupled to a mobile storage device, for example a USB key or a hard disk, which also contains a file system tasked notably with controlling storage operations. However, for a content receiver to control content data storage on a mobile storage device to which it is coupled without damaging the content on the latter, it is essential that their respective file systems are compatible with one another. This results from the operating mode of the middleware of the content receiver. In the event of incompatibility between the file systems, which is very common, the content receiver proceeds to format the storage device before transmitting to it the content data to be stored, which leads to a complete loss of data stored up until then.

SUMMARY OF THE INVENTION

The invention aims to overcome the aforesaid inconvenience while avoiding the loss of data stored on the storage device, where the latter has a file system which is incompatible with the file system of the content receiver to which it is coupled.

To this effect, the invention notably proposes a method dedicated to the storage of content data received by a content receiver having a first file system and comprising, consecutively to a first coupling of a storage device, having a second file system incompatible with the first file system, to the content receiver:

a step (i) consisting in transmitting, from the content receiver to the storage device, a set of control data which constitutes a third system of virtual type files compatible with the first file system, and to store this set in at least one file of the second file system, and a step (ii) consisting in transmitting the content data received from the content receiver to the storage device, under the control of the first file system, and to store this content data transmitted on the storage device under the control of the third file system.

The first method according to the invention can comprise other characteristics that can be taken individually or in combination, and notably:

in step (i) the content receiver can also transmit to the second file system auxiliary data representative of a storage capacity that must be reserved in the storage device to store the content data that must be transmitted, in step (i) before transmitting the control data, the content receiver can determine from the storage device the maximum authorised size and the initial size of files in the second file system, then, if the size of the set (of control data) is greater than the largest size not used among these estimates, the content receiver can break down this set (of control data) into at least two sub-sets destined to be stored respectively in at least two files chosen from the second file system.

The invention also proposes a control device adapted to equip a content receiver having a first file system, and arranged, consecutively to a first coupling of a storage device, having a second file system incompatible with the first file system, to its content receiver:

to instruct its content receiver to transmit to the storage device a set of control data that constitutes a third system of virtual files and compatible with the first file system, so that it stores this set in at least one file of its second file system, and to control the transmission of content data received by its content receiver, from the latter to the storage device, under the control of the first file system, so that this content data is stored in the storage device under the control of the third file system.

The first control device according to the invention can comprise other characteristics that can be taken individually or in combination, and notably:

it can be arranged to instruct its content receiver to transmit to the second file system, in addition to the set (of control data), auxiliary data representative of a storage capacity to be reserved in the storage device to store the content data that must be transmitted;

it can be arranged, before instructing the transmission of this control data, on the one hand to determine from the storage device the maximum authorised size and the initial size of files in the second file system in order to estimate the size not used by each of these files in the second file system, and on the other hand, if the size of the set (of control data) is greater than the largest size not used among these estimates, to break down this set (of control data) into at least two sub-sets destined to be stored respectively in at least two files chosen from the second file system.

The invention also proposes a content receiver comprising a first file system and a control device of the same type as the one presented earlier.

The invention is particularity well suited, but not limited to, the content receivers which constitute a Set-Top Box (STB), a decoder or a residential gateway. Moreover, the invention is particularly well suited, but not limited to, storage devices that constitute a USB key or portable hard disk.

BRIEF DESCRIPTION OF THE DRAWING

Other characteristics and advantages of the invention will emerge on examination of the following detailed description, and of the annexed drawing, in which the single FIGURE illustrates, in a diagrammatic and functional manner a content receiver, in the first instance, connected to a communication network, in the second instance, comprising a control device according to the invention, and in the third instance coupled to a storage device.

The FIGURE in the appendix not only serves to complement the invention but also to contribute to its definition, if required.

DETAILED DESCRIPTION OF PREFERRED EMBODIMENTS

The invention aims to allow the storing, using a mobile storage device SD, of content data from a content receiver CR, when the latter (CR) has a file system S1 that is incompatible with the file system S2 of the storage device SD.

Hereafter, it is considered as a non-restrictive example that the content receiver CR is a Set-Top Box (STB). But, the invention is not limited to this type of content receiver. Indeed, it relates to all types of content receivers capable of being connected to at least one communication network to receive content, and having a file system and at least one connection interface allowing its coupling to a device or peripheral device. Consequently, it could also involve, for example, a decoder, a residential gateway or home gateway.

In addition, hereafter it is considered as a non-restrictive example that the set-top box CR does not have a memory designed to allow the storage of received content. But, the invention also relates to content receivers comprising such a memory.

In addition, hereafter it is considered as a non-restrictive example that the portable storage device SD is a USB key having a connection interface (for example of the male type). But the invention is not limited to this type of portable storage device. It relates to all types of portable storage devices having a file system controlling, notably, its data storage operations. Consequently, it can also be a hard disk, perhaps of the eSATA type, a network disk of the NDS type, or even a server of the Samba type.

The single FIGURE diagrammatically shows a content receiver CR (in this case a set-top box without a memory for content storage) which is connected to a communication network R and to a storage device SD (in this case a USB key).

It is considered in what follows, as a non-restrictive example, that the communication network N is a satellite network. But the invention is not limited to this type of communication network. Indeed, the communication network N can be cabled or wireless. Thus it can also be a wired network of the xDSL type (for example ADSL), a mobile, cellular or WLAN (Wireless Local Area Network—perhaps type 802.11, WiFi or WiMAX), or any other type of digital broadcast (cable or terrestrial) and type of modulation (for example DVB, DSS, ATSC).

This content receiver CR usually comprises a first S1 file system, which is notably responsible for controlling data storage operations of content that are received from the communication network N, and a communication module CM which allows it to connect to the communication network N, notably with the aim of receiving content, possibly broadcast.

For example, the first file system S1 is a proprietary system different to those of the FAT (File Allocation Table) or NTFS (New Technology File System) type.

The content receiver CR also comprises at least one first connection interface C1 intended to allow its coupling to a device or peripheral device, and notably to a storage device SD, for example a USB key. For example, the first connection interface C1 is a female type USB connector.

The storage device SD (here a USB key) typically comprises a memory MS responsible for storing the content data received, a second file system S2 incompatible with the first file system S1 of the content receiver CR and notably responsible for controlling the storage of content data received, and at least a second connection interface C2, intended to allow its coupling to an electronic device, and notably to a desktop computer, laptop or content receiver CR. For example, the second connection interface C2 is a male type USB connector.

For example, the second file system S2 is of the FAT or NTFS type.

The invention proposes to implement a storage method designed to enable the storage onto a USB key SD of content data from the communication network N, despite the incompatibility between the first S1 and second S2 file systems, without this erasing or rendering unreadable any data previously stored on the USB key SD under the control of its second file system S2.

This storage method comprises two steps (i) and (ii) which are implemented successively and consecutively to the first coupling of the USB key SD to the content receiver CR, and consecutively to the activation of an external storage service by the user of the content receiver CR as well as to the selection by this user of at least one received content which he wants to store in the USB key SD, for example by means of a man-machine interface of the content receiver CR.

A first step (i) of the storage method comprises two sub-parts.

A first sub-part consists in transmitting, from the content receiver CR to the storage device SD (in this case a USB key), a set of control data DS, which constitutes a third file system S3, of the virtual type and compatible with the first file system S1. A second sub-part consists in storing the set DS transmitted in at least one file in the second file system S2 of the USB key.

Note that the first sub-part of this first step (i) can be implemented by means of a control device D which, according to the invention, is associated with the content receiver CR.

It is understood here by "associated" both the fact of being an integral part of the content receiver CR (as illustrated), as well as the fact of being coupled directly to the content receiver CR. Consequently, a control device D can be realised in the form of software (or computer) modules, or else of a combination of electronic circuits and software modules. Note that when the device D consists only of software modules, it constitutes what a person skilled in the art may call an adaptation layer comprising a driver combined with an Application Programming Interface (API), as well as a possible graphic interface dedicated to its setting by a user.

This control device D is notably arranged, consecutively to the first coupling of the USB key SD to the content receiver CR, to generate a set of control data DS of the aforementioned type and instruct its content receiver CR to transmit this set DS to the USB key SD so that it stores it in at least one file of its second file system S2.

Note that in the first step (i), the content receiver CR may also transmit to the second file system S2, for example by order of the control device D, the auxiliary data that are representative of a storage capacity that it must reserve in the USB key SD for storing the content data received by the content receiver CR to be transmitted. If the remaining storage capacity of the USB key SD is less than the storage capacity required and represented by the auxiliary data transmitted, the USB key SD signals it to the control device D by a dedicated message, and the D device interrupts its operations and preferably sends a message of storage impossibility to the user of the content receiver CR.

Note also that in the first step (i), the content receiver CR, and for example its control device D, can, before transmitting the set of control data DS, start by determining from the USB key SD the maximum authorised size and initial size of files in the second file system S2 to estimate the size that is not used by each file in the second file system S2.

It is recalled that most file systems include files whose respective sizes must not exceed a predefined maximum size. For example, in the case of a FAT 32 type system, the maximum size of each file is 4 GB Once the estimates for size not used are performed, the control device D determines whether the size of the set DS, which it wants to transmit to the USB key SD, is greater than the largest size not used among the ones it has just estimated.

If so, the content receiver CR (more precisely its control device D) breaks down this set DS into at least two subsets that are intended to be stored respectively in at least two files selected in the second file system S2. It will be understood that this breakdown is intended to ensure that the size of at least one of the files of the second file system S2 does not ultimately exceed the maximum authorised size once a subset of the set DS has been added to it. Note that the subsets are not necessarily of the same size.

If not, the breakdown does not take place and the set DS is fully stored in a second file system S2 that can contain it without its new size exceeding the maximum size.

A second step (ii) of the storage method comprises two sub-parts.

A first sub-part consists in transmitting content data, which has been received by the content receiver CR (and coming from the communication network N), from said content receiver CR to the USB key SD, under the control of the first file system S1. A second sub-part consists in storing in the USB key SD the content data that has been transmitted by the content receiver CR under the control of the third file system S3.

Note that the first sub-part of this second step (ii) may be implemented by means of the control device D. More specifically, the control device D is arranged, following the storage of the set DS in the second file system S2, to control the transmission of content data received by the content receiver CR, from the latter (CR) to the USB key under control of the first file system S1, so that the content data is stored in the USB key SD under the control of the third file system S3.

Thanks to the setting up of a third virtual file system in the second file system of a storage device, it is now possible to store in the memory of the latter content data that comes from a content receiver which has a first file system incompatible with the second file system, without this erasing or prohibiting access to the data previously stored in this memory with the second file system. Hence, thanks to the invention, a content receiver may have an external content recording function whether or not it contains an internal storage memory.

Note that the content data, which was stored in the storage device under the control of the third file system, can be extracted by another device, having a file system compatible with the second but incompatible with the first, only on the condition that it includes suitable software for this purpose (that is to say which can dialogue with the third file system).

The invention is not restricted to embodiments of the storage method, control device and content receiver described above, provided only as a non-restrictive example, but includes all the variants that can be envisaged by those skilled in the art in the framework of the following claims.

The invention claimed is:

1. A method for storing content data received by a content receiver having a first file system, on a storage device coupled to said content receiver, said storage device having a second file system incompatible with said first file system, said method comprising:
    transmitting (i), from said content receiver to said storage device, a set of control data which constitutes a third file system of virtual type compatible with said first file system,
    storing said set of control data in at least one file of said second file system,
    transmitting (ii) the content data received from said content receiver to said storage device, under the control of said first file system, and
    storing said transmitted content data on said storage device under the control of said third file system.

2. The method according to claim 1, wherein transmitting (i) said set of control data comprises transmitting from said content receiver auxiliary data representative of a storage capacity that must be reserved in said storage device to store said content data that are to be transmitted.

3. The method according to claim 1 wherein transmitting (i) said set of control data, comprises determining by said content receiver from said storage device the maximum authorised size and the initial size of the files of said second file system and estimating the size not used by each one of said files of the second file system, then, when the size of said set of control data is greater than the largest size not used among those estimated, breaking down by said content receiver said set of control data into at least two sub-sets to be stored respectively in at least two selected files from said second file system.

4. The method according to claim 1 suited to a storage device selected from a group comprising at least one USB key and at least one portable hard drive.

5. The method according to claim 1 suited to a content receiver selected from a group comprising at least one Set-Top Box type, at least one decoder and at least one residential gateway.

6. The method according to claim 1, wherein said first file system is a proprietary file system of said content receiver.

7. A control device for a content receiver having a first file system, wherein said content receiver is adapted to couple a storage device having a second file system incompatible with said first file system to said content receiver, said control device being arranged
    to transmit, from said content receiver to said storage device, a set of control data constituting a third file system of virtual type and compatible with said first file system, to store on said storage device said set of control data in at least one file of said second file system, to transmit content data received by said content receiver, from the latter to said storage device, under the control of said first file system, and to store on said storage device content data under the control of said third file system.

8. The control device according to claim 7 being arranged to transmit, via said content receiver, to said second file system, in addition to said set of control data, auxiliary data representative of a storage capacity to be reserved in said storage device for storing said content data that are to be transmitted.

9. The control device according to claim 8 wherein said control device is arranged to i) determine from said storage device the maximum authorised size and the initial size of said second file system and estimate the size not used by each of said files of the second file system, and ii), when the size of said set is greater than the largest size not used among the ones estimated, break down said set into at least two subsets to be stored respectively in at least two selected files of said second file system.

10. The control device of claim 7 being suited to a storage device selected from a
group comprising at least one USB key and at least one portable hard drive.

11. The control device of claim 7 being suited to a content receiver selected from
a group comprising at least one Set-Top Box type, at least one decoder and at least one residential gateway.

12. The control device of claim 7 wherein said first file system is a proprietary file system of said content receiver.

13. A content receiver, comprising a first file system and a control device wherein said content receiver is adapted to be coupled a storage device having a second file system incompatible with said first file system, and said control device is arranged to transmit, from said content receiver to said storage device a set of control data constituting a third file system of virtual type and compatible with said first file system, to store on said storage device said set of control data in at least one file of said second file system, to transmit content data received by said content receiver, from the latter to said storage device, under the control of said first file system, and store on said storage device content data under the control of said third file system.

14. The content receiver according to claim 13, wherein said content receiver belongs to a group comprising at least one of a Set-Top Box, a decoder and a residential gateway.

15. The content receiver according to claim 13 being suited to a storage device selected from a group comprising at least one USB key and at least one portable hard drive.

16. The content receiver of claim 13 being arranged to transmit to said second file
system, in addition to said set of control data, auxiliary data representative of a storage capacity to be reserved in said storage device for storing said content data that are to be transmitted.

17. The content receiver of claim 13 wherein said first file system is a proprietary file system of said content receiver.

18. The content receiver according to claim 13 wherein said control device is arranged to determine from said storage device the maximum authorized size and the initial size of the files of said second file system and to estimate the size not used by each one of said files of the second file system, then, when the size of said set of control data is greater than the largest size not used among those estimated, breaking down said set of control data into at least two sub-sets to be stored respectively in at least two selected files from said second file system.

* * * * *